IDENTIFICATION SYSTEM

Filed March 24, 1961 3 Sheets-Sheet 1

Inventor :
Robert L Watters,
by Joseph V. Claeys
His Attorney.

Inventor:
Robert L. Watters,
by Joseph V. Claeys
His Attorney.

IDENTIFICATION SYSTEM

Filed March 24, 1961 3 Sheets-Sheet 3

Inventor:
Robert L Watters,
by Joseph V. Claeys
His Attorney.

3,270,338
IDENTIFICATION SYSTEM

Robert L. Watters, Schenectady, N.Y., assignor to General Electric Company, a corporation of New York Filed Mar. 24, 1961, Ser. No. 98,098
7 Claims. (Cl. 343—6.5)

Figure 1:
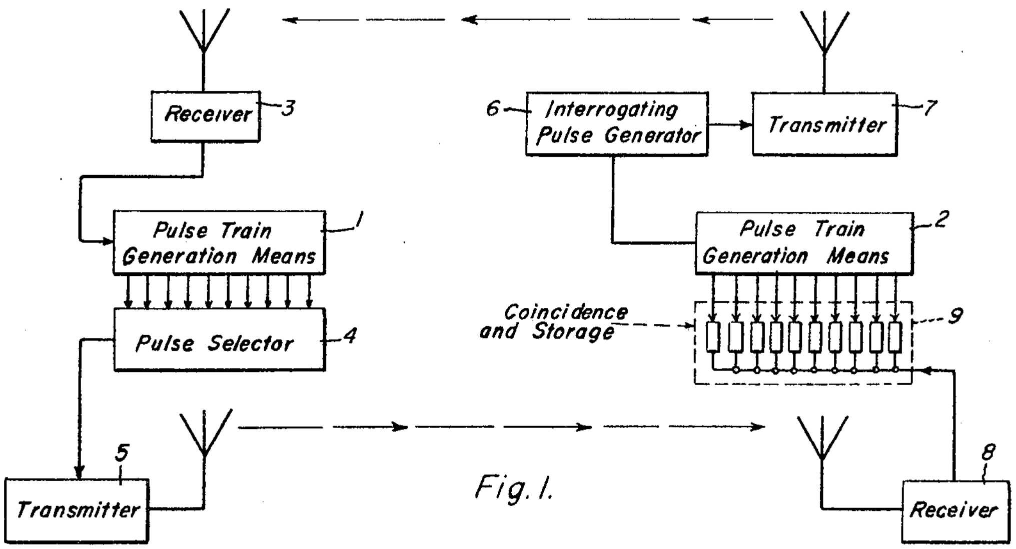

This invention relates to communication systems and in particular to a novel system in which data to be determined from a plurality of coded stations is transformed and transmitted in the form of a group of pulses spaced in time and of predetermined number and arrangement in response to an interrogating signal from one of a plurality of interrogating stations; the number and arrangement of the pulses in the group being dependent upon the data which is represented.

While this invention is subject to a wide range of applications it is especially suited for use wherein preassigned data from a large number of coded stations is desired in response to an interrogating signal from an interrogating station. The large number of coded stations involved each of which is required to transform and transmit specific preassigned data to an interrogating station requires that the apparatus at each of the coded stations be as simple and inexpensive as possible. In addition, the apparatus at each coded station must ordinarily be extremely rugged so as to withstand shocks and other forms of abuse as well as being substantially maintenance free.

One specific application of this type, for example, is that of determining certain assigned data from railroad cars, such as car number and owner, in response to an interrogating signal from an interrogating station as a particular train, including a large number of such cars, passes a predetermined location. The data assigned to each car is conveniently represented by binary information, which information is transformed into a particular group of pulses, representative of specific assigned data, and transmitted to the interrogating station in response to the interrogating signal therefrom. The reliable operation of the system utilized in such applications, therefore, must be substantially unaffected by such conditions as rain, mud, snow, ice, light, darkness and the like.

It is an object of this invention to provide a novel, inexpensive, high speed system for sending and receiving data coded in the form of a group of pulses of predetermined number and arrangement, initiated by an interrogating signal from an interrogating station, and representative of the data to be transmitted.

It is another object of this invention to provide an inexpensive high speed means for initiating, transforming and transmitting information from a coded station in response to an interrogating signal from an interrogating station.

It is a further object of this invention to provide a simplified "read out" means responsive to a locally produced group of pulses initiated by an interrogating signal and a series of received pulses of predetermined number and arrangement from a coded station, which received pulses are also initiated by a similar time related interrogating signal, to provide an output exactly corresponding to the data signal transmitted by the coded station.

It is a further object of this invention to provide a simple, rugged and reliable passive means for developing a group of time spaced pulses in response to an initiating signal.

It is yet another object of this invention to provide passive circuit means at a plurality of coded stations for transforming and transmitting preassigned data in response to an interrogating signal from an interrogating station.

It is a still further object of this invention to provide novel and inexpensive nonlinear passive circuit means comprising a plurality of sections each capable of producing an output, spaced in time, in response to an initiating signal from an interrogating station.

It is another object of this invention to provide an artificial-type line including at each section thereof a saturating core for producing an output in the form of time spaced pulses in response to an initiating signal.

It is a still further object of this invention to provide a fast, inexpensive and reliable communication system for the identification of a large number of units in turn, each of which has preassigned data associated therewith, in response to an interrogating signal from an interrogating station.

Briefly stated, in accordance with one embodiment, the invention comprises one or more central interrogating stations and a plurality of coded stations to be interrogated, each possessing preassigned data to be ascertained. Means are provided at each of the coded stations for receiving an interrogating signal, and means for transforming and transmitting the preassigned data in the form of a selected group of time spaced pulses in response to a received interrogating signal. Means are provided at the interrogating station for generating and transmitting an interrogating signal to each of a predetermined group of said coded stations in turn, for receiving the selected groups of pulses representative of the assigned data of the respective coded stations interrogated, and for coincidence-gating each of the received groups of pulses in turn with locally produced time synchronized pulses initiated by said interrogating signal to obtain and store an output corresponding to the transmitted data. Means may be further provided applying said data to decoding, printing, data processing, or other utilization means.

Figure 2:
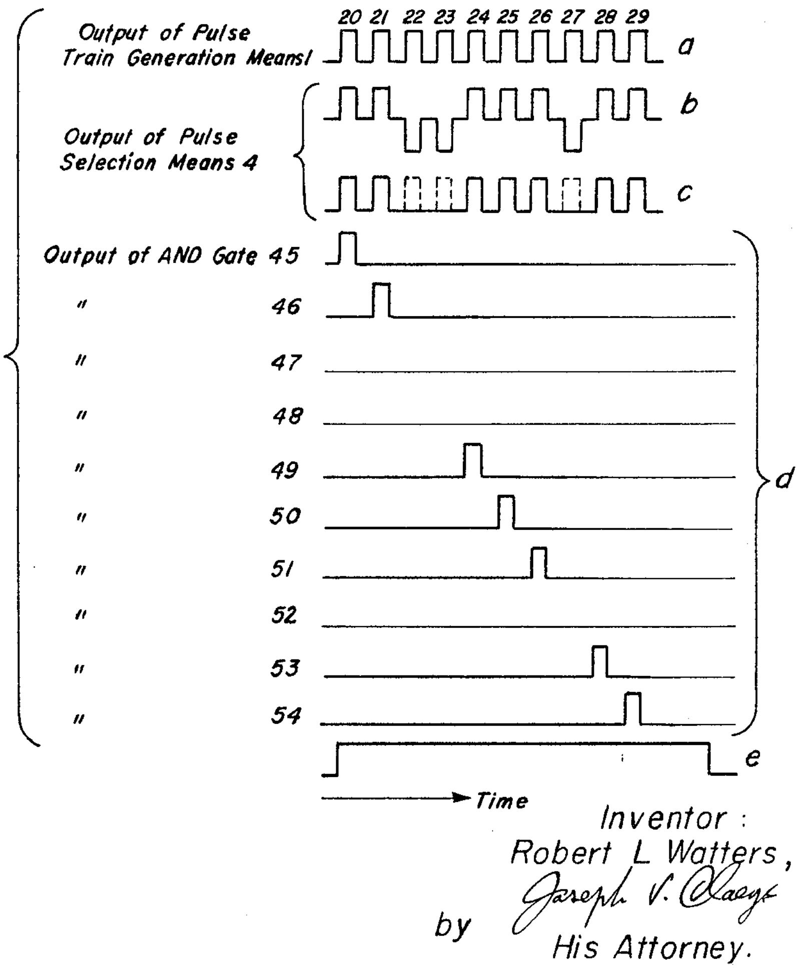
Figures 3, 5, 6, 7:
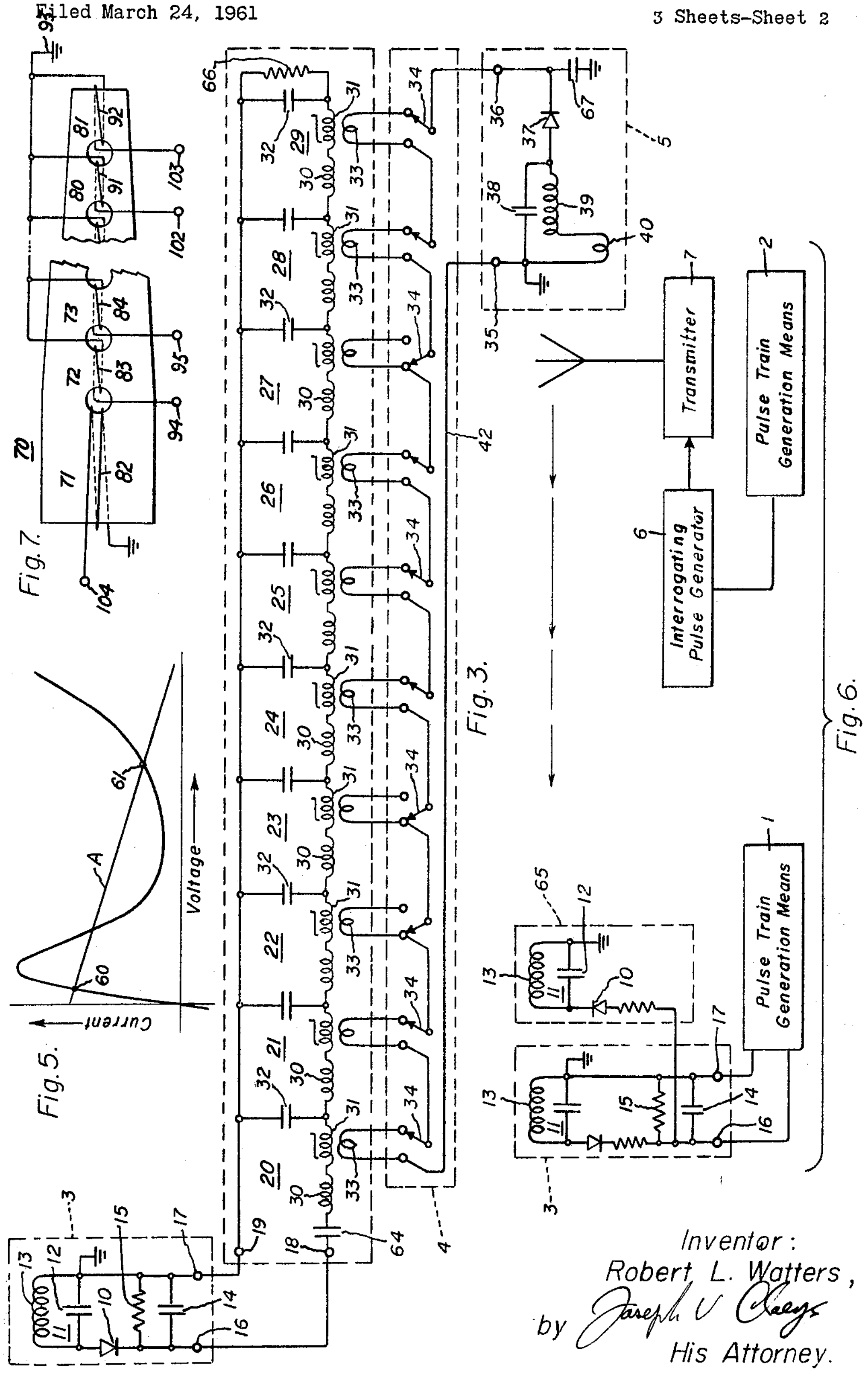
Figure 4:
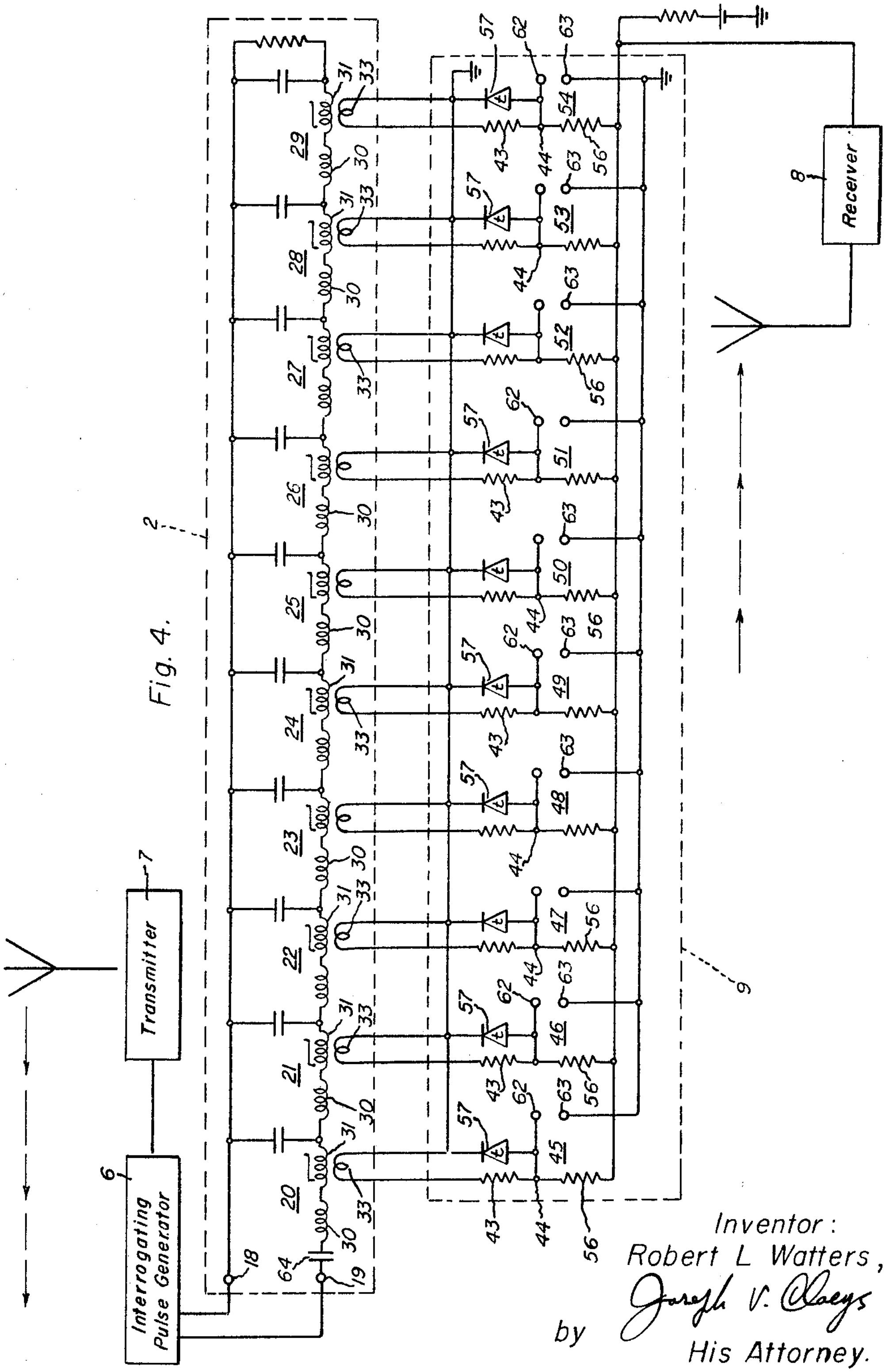

The features of my invention which I believe to be novel are set forth with particularity in the appended claims. My invention itself, however, both as to its organization and method of operation together with further objects and advantages thereof may best be understood by reference to the following description taken in conjunction with the accompanying drawing in which:

FIG. 1 is a block diagram of a typical system in accordance with this invention, FIG. 2 shows a number of typical wave forms obtained from the pulse train generation means, the pulse selector means and the output of the coincidence and storage circuit means respectively, FIG. 3 is a schematic circuit diagram of the apparatus of a sending station suitable for use in the practice of this invention as represented by the various blocks in the diagram of FIG. 1, FIG. 4 is a schematic circuit diagram of the apparatus at a suitable receiving station represented by the various blocks in the diagram of FIG. 1, FIG. 5 is a current-voltage characteristic of a typical tunnel diode device such as is particularly suited for use in certain apparatus of this invention; and, FIG. 6 is a diagram, partly in block form, of a portion of the system illustrating another embodiment of this invention employing different reset means.

In this invention the apparatus required at each of the coded stations, for example, each of the railroad cars in a railroad car identification application, for transforming and transmitting the data assigned thereto is extremely simple, rugged, substantially maintenance free and substantially immune to any of the conditions listed above. In addition, my novel arrangement is capable of extremely reliable operation at very low power. For example, the interrogating signal from the interrogating station may be conveniently utilized to provide the power for the initiation and development of the group of time spaced pulses representative of the assigned data, as well as, for the transmission thereof to the receiving station and no separate power supply need be provided for the apparatus of each of the many coded stations. As will be described in more detail hereinbelow with respect to the detailed description of specific apparatus suitable for use at the coded and interrogating stations of this system, the receiving and transmitting means at the coded stations may utilize extremely reliable, long life, low power solid state devices, such as for example, crystal diodes and tunnel diode devices. Further, passive circuit means such as linear or nonlinear artificial-type lines may be provided for producing the required group of time spaced pulses in response to an interrogating signal. For example, one such passive circuit means may advantageously employ rugged, reliable, and inexpensive nonlinear means, as for example, saturable magnetic cores or the like.

The symbols which may be sent and received by the system of this invention may represent any selected data such as the digits of numerical notation, letters of the alphabet, or any other arbitrary symbols which may be chosen. It is well-known that data may be represented in the binary system of notation by the two quantities 1 and 0. In the binary system, for example, a signal on one of two different lines, the presence or absence of a signal or a positive or negative signal may be conveniently utilized to represent a binary 1 or 0 respectively.

In the communication system of this invention binary data, in the form of a group of pulses spaced in time and of predetermined number and arrangement, is obtained from a plurality of coded stations in turn in response to interrogating signals from an interrogating station.

The coded station is provided with apparatus which, in response to a received interrogating signal from an interrogating station, generates a group of pulses spaced in time. Pulse selection means transforms this group of pulses into a group having a predetermined number and arrangement representative of the assigned data to be transmitted characteristic of the identification and/or status of the interrogated coded station.

The interrogating station is provided with apparatus for generating and transmitting the interrogating signal and for generating a like group of pulses in response to the interrogating signal. These means, at both the coded and interrogating stations, for generating the group of pulses will be also referred to hereinafter as "pulse train generation means." The interrogating signal generated at the interrogating station is simultaneously transmitted in turn to the coded station within the range of such transmission and applied to the pulse train generation means at the interrogating station causing the initiation, substantially simultaneously, of a like group of pulses at both the coded and interrogating stations. "Read out" means at the interrogating station, responsive to the simultaneous application of a received pulse from the coded station and a locally generated pulse from the pulse train generation means at the interrogating station, causes an output to be developed at the respective coincidence circuits which is in the form of pulses exactly corresponding to the group of pulses transmitted from the coded station and representative of the assigned binary data transmitted.

The read out apparatus at the interrogating station, therefore, responds to a received pulse from the coded station and a pulse from the pulse train generation means of the interrogating station, both of which are produced in response to a similar time related interrogating signal and are of like time relationship. No further synchronizing operation is necessary. If desired, however, a suitable synchronizing signal may be obtained from the pulse train generation means at each of the respective coded stations which may be transmitted on a different frequency, for example, to the interrogating station. Such means would contribute little expense or circuit complexity to the coded station apparatus since such a synchronizing signal may be provided by the simple expedient of employing additional means for taking an output from each of the respective possible outputs of the pulse train generation means and providing for the transmission thereof.

High speed communication of predetermined data from a remote coded station in response to an interrogating signal from an interrogating station is provided with applicant's novel arrangement because the respective transmitting and receiving apparatus may easily generate and respond to the group of pulses at a very high speed if required. For example, the time required is only that necessary to generate a group of pulses spaced in time representative of the assigned data. This may be accomplished extremely fast by providing a group of relatively short pulses of predetermined number and arrangement to represent the assigned data.

Further, the novel arrangement of this invention makes possible the generation and reception of the assigned data by means of a system employing a combination of simplified and inexpensive apparatus. No involved or exacting synchronization circuitry or operations are required; the synchronization being inherent in the mode of operation employed with the system itself.

The group of pulses is initiated in response to the interrogating signal from the receiving station thereby further contributing to the simplicity of the apparatus required at the coded stations. A passive and extremely inexpensive pulse train generation means at both the sending and receiving stations, for example, may conveniently be in the form of an inexpensive nonlinear artificial-type transmission line employing saturating cores or the like which produces a group of pulses spaced in time in response to an initiating pulse. A preferred, simple and very inexpensive means of this type for producing a required train of pulses is shown in detail in the schematic circuit diagram of FIGS. 3 and 5, and produces one output per section without the use of either a power supply or active circuit elements. Another passive means for producing such a group of pulses, for example, may be a linear delay line utilizing either lumped or distributed constants, however, the well-known relationship between bandwidth and rise time in linear circuits introduces serious limitations when a group comprising more than a few time spaced pulses is required. Alternatively, active nonlinear circuit elements, such as for example, transistors or vacuum tubes, may be employed in combination with such a linear delay line in order to provide a suitable group of pulses for use in the practice of this invention. The use of such active circuit elements, however, contribute to the cost as well as the circuit complexity and power requirements of the apparatus.

For purposes of this disclosure the signal representative of the assigned data to be determined is represented by a group of pulses spaced in time and of predetermined number and arrangement. These pulses are transmitted from the coded to the interrogating station by means of radio frequency transmission means. It will be apparent to those skilled in the art, however, that the invention is not to be limited to this particular form of signal transmission medium as the system is capable of operation by using any other equivalent arrangement. For example, when both the interrogating and coded stations are stationary, the group of pulses representing the assigned data, may be transmitted from the coded to the interrogating station by wire.

In FIG. 1 there is shown a block diagram of a typical communication system in accordance with this invention. The system shown in FIG. 1 illustrates only one coded and interrogating station, although it will be understood from the above discussion, that a large number of coded stations would ordinarily be utilized as well as one or more interrogating stations located usually at various different locations.

Each interrogating station may desire to ascertain the assigned data from each of the many coded stations in turn at some particular time. For example, the data assigned to the individual railroad cars may be ascertained at a plurality of different locations along the route a train is traveling as it arrives at this particular location. As a particular railroad car passes a specified location, for example, means may be actuated for causing the transmission of an interrogating signal, from the interrogating station associated with that location, to the coded station which has caused such transmission. Since this actuating means also assures that the car is in the range of transmission, this signal is received by the coded station causing a group of pulses to be produced which in accordance with a preset pulse selection means causes a selected group of pulses representative of the particular railroad car data, such as owner and car number, to be applied to the transmitter means for transmission to the interrogating station. This transmitted data in the form of a selected group of time spaced pulses is then received and coincidence-gated at the interrogating station as described hereinabove. The coded station of each of the respective cars of a particular train, therefore, is interrogated in turn and the preassigned data associated therewith is rapidly and reliably obtained.

The system shown in FIG. 1, comprises a single coded station A and an interrogating station B each including a passive circuit means 1 and 2, respectively, for generating a similar group of pulses, spaced in time, in response to an initiating signal, hereinafter referred to also as an "interrogating signal."

The coded station further includes a receiving means 3 for receiving an interrogating signal from the interrogating station, a pulse selection means 4 for converting the group of pulses generated into a group of pulses of predetermined number and arrangement to represent the assigned data to be transmitted, and a transmitter 5 for sending the predetermined group of pulses to the interrogating station at any other selected frequency referred to as the response frequency $f_2$.

The receiving station B includes, in addition to the pulse train generation means 2, a pulse generator 6 for generating the interrogating signal and a transmitter 7 for sending this signal to the remote sending station at any selected frequency referred to as the interrogating frequency $f_1$. The interrogating station further includes a receiver 8 for receiving the signal on response frequency $f_2$ from transmitter 5 of coded station A and a coincidence and storage means 9 responsive to the simultaneous application of a received pulse from station A and a generated pulse from station B to produce an output which corresponds exactly with the binary information assigned to the coded station.

The operation of the system of this invention is as follows:

When it is desired to obtain the assigned binary information from the coded station, interrogating pulse generator 6 is energized and the interrogating signal produced thereby is applied substantially simultaneously to transmitter 7 and the input of pulse train generation means 2. This interrogating signal is received at the coded station A by receiver 3 and applied to the input of pulse train generation means 1. The substantially simultaneous application of the interrogating signal to pulse train generation means 1 and 2 respectively causes the simultaneous initiation of like pulses having a similar time relationship.

Pulse train generation means 1 and 2 are both provided to produce a predetermined total number of time spaced pulses in response to an interrogating signal. At the coded station certain of these pulses are suitably connected by a pulse selection means to provide a group of pulses which represent the data assigned to that particular coded station, while at the interrogating station each pulse is applied to one of a plurality of coincidence gates. For example, in the diagram of FIG. 1 the total number of pulses shown is 10, however, for an application having a very great number of units, to which a great amount of data must be assigned, the total number of pulses produced would be greater to provide adequate combinations of pulse groups. A total of 30 pulses, for example, would provide $2^{30}$ different code combinations and would no doubt be more than adequate for almost any application.

In the drawings and in the specification a total group of 10 pulses has been chosen, for illustrative purposes only, to simplify the drawing and the description required in the specification. In addition, the pulse generation means 1 and 2 at the coded and interrogating station are shown as similar in type and arrangement. It is to be understood, however, that it is the number of pulses generated which is required to be the same as both stations rather than any requirement that the means employed at each station be the same. Since the novel pulse generation means of this invention is so particularly suited for use in the system of this invention, in that it is very simple, inexpensive, rugged, passive and substantially maintenance free, the preferred embodiment shown in the drawings and described in this specification will be with reference to pulse generation means 1 and 2 being of this similar type; the circuit details of which will be given hereinafter in the description of FIGS. 3 and 4 respectively.

Pulse selection means 4 at the sending station selects certain of the pulses generated by pulse train generation means 1 at the sending station to represent the assigned data to be transmitted. For example, the selection may be by the provision of an arrangement of positive and negative pulses from an initially generated group of pulses, or certain of the initially generated time spaced pulses may be eliminated providing a group of pulses differing in number and arrangement from the originally generated group. These two alternatives may be conveniently accomplished, for example by reversing, leaving out, or shorting out, certain of the serial pulse outputs respectively.

The output of the pulse selector 4 represents the assigned binary coded information in the form of a group of pulses of predetermined number and arrangement. This may be shown more specifically by reference to FIG. 2. FIG. 2($a$) shows waveforms of the output of the pulse train generation means 1. Pulse train generation means 1 and 2, respectively, produce similar groups of pulses, which have been initiated substantially simultaneously by the interrogating signal, to produce pulses which are substantially synchronized in time. FIG. 2($b$) shows typical waveforms of the output of the pulse selector 4 to provide a particular group of pulses representative of specific assigned binary information in the form of positive and negative pulses wherein a positive pulse represents a binary 1 and a negative pulse a binary 0 respectively. Similarly, FIG. 2($c$) shows waveforms of a particular group of pulses, representing specific binary information, in which the presence or absence of a pulse represents a binary 1 or a binary 0 respectively.

This binary information, in the form of a group of time spaced pulses, is applied to transmitter 5 for transmission thereby at the response frequency $f_2$ to the interrogating station. For example, the pulses to be transmitted may be utilized to "key" transmitter 5 on and off or to either amplitude or frequency modulate a selected carrier, or if desired to both amplitude and frequency modulate such carrier all in well-known manner.

The pulses are received by the receiver 8 at the interrogating station and applied together with the pulses from pulse train generation means 2 to the respective portions of coincidence and storage circuit means 9.

Coincidence and storage circuit means 9 is responsive to the simultaneous application of a received pulse from the coded station and a locally generated pulse from the pulse train generation means 2 at the interrogating station and produces an output which corresponds exactly with the assigned binary data transmitted from the coded station. For example, coincidence and storage circuit means 9 may include a plurality of coincidence circuits or so-called "and" gates, one associated with each of the pulses generated by pulse train generation means 2. An output is produced only when the pulse corresponding in time is present at the output of the associated "and" gate from both receiver 8 and pulse train generation means 2. The outputs of the respective "and" gates are representative of the assigned binary data transmitted and may be applied to any utilization means for obtaining the desired data in more convenient form in any well-known manner. This output may be utilized in various ways depending upon how the information is to be used. For example, the coded information may be decoded, stored or applied to suitable printing out data processing or other desired equipment.

In FIG. 3 there is shown a schematic circuit diagram of apparatus suitable for use at each of the coded stations employed in the communication system of this invention. For example, in a railroad car identification application, each railroad car would require only the simple and inexpensive apparatus shown by the circuit diagram of FIG. 3. In FIG. 3 there is shown a receiving means 3, pulse train generation means 1, pulse selection means 4 and transmitter 5 corresponding to the respective blocks in the diagram of FIG. 1.

As referred to above, the binary information may be represented in different ways, such as by a group of positive and negative pulses or a group of pulses wherein the presence of a pulse or a positive pulse represents a binary 1 and the absence thereof or the presence of a negative pulse represents a binary 0. For simplicity of the drawing and the specification the following description and explanation will be with reference to the representation in which the presence of a pulse denotes a binary 1 and the absence of a pulse a binary 0. It will be understood by those skilled in the art, however, that when employing positive and negative pulses, some changes in the specific pulse selection means and the transmission means are required. Such changes are evident and well-known to one skilled in the art. For example, the positive pulses may be transmitted at a first frequency while the negative pulses are transmitted at a second frequency, if desired. None of these changes in any way alters the effectiveness or principle of operation of the invention as described. It is often found desirable, however, to provide for the transmission of a signal, such as one of opposite polarity, rather than no signal at all in which case it is convenient to employ the positive and negative representation.

In FIG. 3, receiver means 3 may be conveniently a simple crystal detector including crystal diode 10 and a parallel resonant circuit 11 including capacitance 12 and inductance 13. The direct current output in response to an applied carrier signal is developed by means of capacitance 14 and resistance 15 and appears at the terminals 16 and 17.

The output of receiver means 3 is connected to the input terminals 18 and 19 of pulse train generation means 1. Pulse train generation means 1 comprises an artificial-type line having a plurality of sections for producing pulses spaced in time in response to an initiating signal and is shown having a plurality of sections 20 to 29 to produce a total of 10 pulses. As stated hereinbefore, if more pulses are required more sections may readily be provided, but to simplify the specification the pulse train generation means 1 is shown as having only 10 sections and, therefore, capable of producing a group of 10 time spaced pulses.

Each section of the pulse train generation means 1 includes an inductance 30 and a saturating core 31. These may be separate components, as shown schematically, or combined on a suitable composite core which includes both saturating and non-saturating material in a known manner. Alternatively, a resistance may be employed in place of inductance 30 which although consuming power, may at times be desirable from the cost standpoint.

Core 31 is provided with sufficient windings to assure its saturation with the output signal available from receiver means 3. Alternatively, the output of receiver means 3 may be applied to a current transformer to increase the magnitude of the current to the terminals 18 and 19 so that only a single wire need be used on which the cores may be suitably stacked. A capacitance 32 is connected in shunt with the line between each of the respective sections. The line is completed by means of a resistance 66 or a short circuit.

A sampling winding 33 magnetically coupled to core 31 is provided to detect the change in flux at each of the cores 31. The cores saturate sequentially as the wavefront of the interrogating pulse is propagated along the line. A pulse is produced at each sampling winding 33 due to the changing flux in each of the cores 31. Each pulse is displaced a predetermined time later than the start of the interrogating pulse applied from the receiver means 3. The time displacement between the output pulses is determined by the core 31, the inductance 30 and the value of capacitance 32 in each section. The output of each sampling winding 33 is connected in series as shown and a group of pulses is produced which are displaced in time.

From the above description, therefore, it has been shown that my pulse train generation means is made up of passive circuit elements only, no energy sources are included, and pulses are produced at each of the respective sections.

Since for purposes of this invention a group of pulses having a particular number and arrangement is assigned to represent specific data, only certain of the total generated pulses are selected in any given case. For example, pulse selection means 4 is shown conveniently, and for simplicity, as a group of switches having movable switch arms 34 which may be employed to connect only certain of the sampling winding in series. As shown in FIG. 3, for example, the sampling windings in sections 22, 23 and 27, have not been included in the series output line and the assigned data, therefore, is represented by the group of pulses shown in FIG. 2(*c*) wherein these pulses are absent. The absent pulses are shown in phantom by the broken lines to indicate their time position in the initially produced pulses from pulse train generation means 1. Alternatively a reversing switch may be employed in place of the single switch arm 34 in which a pulse group such as that shown in FIG. 2(*b*) would be produced to represent the same assigned data; the binary 1 represented by the positive pulse, for example, and the binary 0 by the negative pulse. The group of pulses so selected to represent the assigned data is coupled to the input terminals 35 and 36 of transmitter 5. Although any conventional type of transmitter apparatus may be employed, a simple low power tunnel diode transmitter, as shown is preferred; such a transmitter being simple, inexpensive, extremely reliable and capable of being energized with a low power pulse such as may be very conveniently produced from pulse generation means 1.

Transmitter means 5, therefore, includes a tunnel diode device 37, a parallel resonant circuit including capacitance 38 and inductance 39, one winding 40 of which may be utilized as a suitable antenna for radiating the signal. One side of the tunnel diode device 37 is connected to one end of the series of sampling windings 33 over conductor 41. The other end of series of sampling windings 33 are connected to the parallel resonant circuit over conductor 42. A by-pass capacitance 67 is connected across the series of selected windings.

As is well-known the tunnel diode device exhibits a region of negative resistance in the low forward voltage range of its current-voltage characteristic. Since the series of sampling windings have a relatively low resistance to direct current the tunnel diode device is effectively connected to a low impedance source. When a suitable pulse from the pulse train generation means 1 is applied to the terminals 35 and 36 of the transmitter 5, therefore, an average bias in the negative resistance region is established. This low resistance assures that the slope of the direct current load line established thereby will intersect the tunnel diode current-voltage characteristic at only one point. With such a direct current load line the tunnel diode is prevented from switching and, with an appropriate voltage condition, an operating point may be established in the negative resistance region. Under such conditions the tunnel diode device produces oscillations at the frequency at which the highest impedance is presented thereto. The highest impedance presented to the tunnel diode device in the transmitter circuit 5 is that due to the parallel combination of capacitance 38 and inductance 39 at the parallel resonant frequency thereof.

As each pulse is applied to the transmitter terminals 35 and 36, therefore, oscillations are produced as soon as the voltage across the tunnel diode device is such as to establish an operating point in the negative resistance region thereof provided the absolute value of the negative resistance is less than resonant impedance. Such oscillations cease as soon as the absolute value of the average negative resistance is greater than the resonant impedance. Preferably, therefore, the magnitude of the voltage pulses from the sampling windings 33 should be such that the voltage across tunnel diode device 37 does not exceed that corresponding to the highest voltage limit of the negative resistance region of the particular tunnel diode device employed.

The forward voltage range at which the negative resistance region appears in such tunnel diode devices depends upon the semiconductive material from which they are fabricated. For example, typical voltage ranges for the negative resistance region may be from about 0.04 to 0.3 volt for a germanium device while for a gallium arsenide device the range may be from about 0.12 to 0.5 volt.

Further details of such tunnel diode devices, which are particularly suitable for use in the practice of this invention may be had by reference to the booklet entitled "Tunnel Diodes," published in November 1959 by Research Information Services, General Electric Company, Schenectady, New York.

The above described apparatus is all that is required at each of the many coded stations, such as for example, the individual railroad cars to be identified. The circuitry required is extremely simple, a very small number of relatively inexpensive circuit components are required and the entire apparatus may be readily provided to have the utmost reliability and freedom from maintenance, all of which are of major importance in any type of communication system wherein the data from a very large number of units is to be ascertained in response to an interrogating signal from a particular interrogating station.

In FIG. 4 there is shown a combination schematic and block diagram of apparatus suitable for use at the interrogating station of the system of this invention. In FIG. 4 interrogating pulse generator 6, transmitter 7, and receiver 8 are shown in block form since these means may be any of the respective types well-known in the art for providing these functions. Receiver 8 should have sufficient bandwidth to receive the required group of pulses and gain enough to reliably operate the respective "and" gates.

In FIG. 4 the pulse train generation means 2 is shown as a unit similar to that described for pulse train generation means 1 at the coded station. Pulse train generation means 2, therefore, also comprises sections 20 to 29 each of which includes a similar arrangement of elements and are, therefore, identified by the same reference numerals.

The output of interrogating pulse generator 6 is applied to transmitter 7 and also to the input terminals 18 and 19 of pulse train generation means 2 to cause pulses to be produced at the sampling winding 33 of each of the sections 20 to 29. Each of the pulses so produced is displaced in time with respect to the interrogating pulse from pulse generator 6. For the specific circuit illustrated, employing the windings 33 to detect the change in flux in the cores 31, the interrogating pulse should have a duration longer than the period of time required to produce the total number of pulses required for the particular application. For example, for pulse train generation means, 1 and 2 respectively, having a capacity of 10 pulses with each pulse spaced about 1 microsecond, for example, the duration of the interrogating pulse from pulse generator 6 may be conveniently about 12 to 15 microseconds. A typical pulse of this kind is shown at FIG. 2(*e*). Employing a different means of obtaining an output from core 31, however, will allow for the use of a much shorter duration pulse if desired.

The output of each of the sections 20 to 29 is applied through a resistance 43 to the input terminal 44 of each of the "and" gates 45 to 54. The output of receiver 8 is applied over common conductor 55 to each of the terminals 44 of "and" gates 45 to 54 through resistance 56 at each "and" gate.

Each of the "and" gates 45 to 54 includes a tunnel diode device 57 one terminal of which is connected to the input terminal 44 and the other terminal to a source of reference potential such as ground. Each of the tunnel diode devices 57 is provided with an average direct current bias to assure two stable operating points. This bias source is shown schematically as a battery 58 one side of which is connected through resistance 59 to conductor 55 and the other side to ground. The values of resistances 43 and 56 in each "and" gate and the bias means are chosen with respect to both the received and locally generated pulses to assure that with less than two input pulses present at the terminal 44 the tunnel diode device operates, for example, in a low voltage condition. This low voltage condition corresponds to a value below the voltage corresponding to the tunnel diode peak current. With at least two pulses present at the terminal 44, however, the tunnel diode device 57 is at a voltage greater than the voltage corresponding to the tunnel diode peak current causing switching to a second stable higher voltage operating condition. Alternatively, the operating condition with less than two input pulses may be made the high voltage condition with the presence of two inputs causing switching to a lower voltage condition.

The operation of the tunnel diode device may be shown more clearly by reference to FIG. 5 which is a current-voltage characteristic of a typical tunnel diode device. The load line A represents the average bias condition in the absence of any received or locally generated signals at the terminal 44 of the tunnel diode "and" gate. Load line A shows the low voltage operating point 60 and the higher voltage operating point 61. With less than two input pulses present the operating point remains at a position of the characteristic having a voltage less than that corresponding to the tunnel diode peak current. With at least two signals the voltage corresponding to the tunnel diode peak current is exceeded causing switching to the higher voltage operating point 61. This change in voltage across tunnel diode 57 provides the output at the respective "and" gate and is available at the terminals 62 and 63.

In the operation of my novel communication system, the binary data making up the assigned data to be transmitted is set up, for example, by an appropriate selection of the switch arms 34 in pulse selection means 4. A different selection is made for each of the different coded stations. While this selection is shown, for simplicity, as the position of the switch arms 34, it is to be understood that various other known means of selecting these pulses may likewise be employed. In many applications, the cost of the apparatus at each coded station must be kept to a minimum, so that as inexpensive a means as possible will in these instances be employed. Such switches either omit, or connect in series, the various sampling windings 33 of the sections 20 to 29 respectively to provide a particular group of pulses representative of specific assigned data. One typical selection, for example, is shown by the pulse group in FIG. 2(*b*).

As the selected pulses are provided in response to a received interrogating pulse from receiver 3, they are applied to the input of the transmitter 5 turning it "on." As the next selected pulse arrives, the transmitter is again energized, and so on for the sequentially arriving pulses, resulting in bursts of carrier waves each of a duration and time arrangement corresponding to the pulses from pulse selection means 4 employed for "keying" transmitter 5.

The interrogating station coincidence-gating apparatus is conditioned by applying the interrogating pulse from pulse generator 6 to transmitter 7 for transmission to the coded station and to the input terminals of pulse train generation means 2. The interrogating pulse applied to pulse train generation means 2 causes a pulse to be developed at each of the sections 20 to 29 respectively. Each of these pulses is synchronized in time with the pulses produced by the pulse train generation means 1 at the coded station. Each of these pulses is applied to the "and" gate associated with the respective time spaced pulse. For example, the output of section 20 is applied to "and" gate 45, the output of section 21 to "and" gate 46, and so on, with the output of section 29 being applied to "and" gate 54. The time spaced pulses received from the coded station by receiver 8 are applied in common to all of the "and" gates 45 to 54. The tunnel diode "and" gates produce an output only when at least two pulses are present at the input, thus, if there is no received pulse from the coded station present at a particular "and" gate then only the locally generated pulse will be applied thereto and switching of the tunnel diode device will not occur.

Assume, for example, that the assigned data transmitted is a group of pulses such as shown in FIG. 2(*c*). These pulses will be received by receiver 8 at the receiving station and applied in common to all of the terminals 44 of "and" gates 45 to 54. As the first pulse in time is produced in pulse train generation means 2 it is applied to "and" gate 45 which also has received a similar pulse from the coded station over receiver 8 so that switching occurs resulting in an output at the terminals 62 and 63 thereof. This is shown in FIG. 2(*d*) as the output of "and" gate 45. Similarly pulses are received at "and" gates 46, 49, 50, 51, 53 and 54. These outputs are also shown in FIG. 2(*d*) as the corresponding outputs of these "and" gates and each has a characteristic time displacement as shown. The "and" gates 47, 48 and 52, however, although also having a locally generated pulse applied from the associated sections 22, 23 and 27 of pulse train generation means 2, do not receive a pulse from the coded station from receiver 8 over conductor 55. Since there is only one input pulse present at terminal 44 of each of these "and" gates no outputs are available at their respective terminals 62 and 63 and no pulses are shown in FIG. 2*e* for these.

It will be observed, therefore, that the individual outputs from "and" gates 45 to 54 correspond in number and time relationship with the group of pulses transmitted from, and which are representative of, the specific data assigned to, that particular coded station.

Means are provided for resetting the cores 31 to their initial remanence condition in pulse generation means 1 and 2, respectively, as well as for returning the tunnel diodes in each of the "and" gates 45 and 54 to their initial voltage operating conditions. To this end a capacitance 64 may be utilized at each of the pulse train generation means 1 and 2 connected in series with the interrogating signal input thereto as shown in FIGS. 3 and 4 respectively. When the interrogating signal is applied to the terminals 18 and 19, initiating the group of pulses, capacitance 64 begins to charge. At the end of the interrogating pulse capacitance 64 discharges thereby resetting each of the cores 31 in sections 20 to 29 in pulse train generation means 1 and 2 respectively. The discharge of capacitance 62 in pulse train generation means 2 may be utilized if desired to cause the tunnel diode devices in each of the "and" gates to be also returned to their initial operating conditions. Depending upon the way in which the received data is to be utilized, however, this may not always be desirable in which case the tunnel diodes may be maintained in the condition to which they have been switched to store this data for as long a period as is desired. Resetting may then be accomplished by means of a voltage of opposite sense from that which caused switching or the current in the average biasing line may be momentarily interrupted.

There are many other means well-known in the art for accomplishing such resetting operation; the exact method chosen and the circuit details depending upon such factors as the storage time desired, cost of the apparatus and other practical considerations as well as the ultimate utilization of the received data.

One other specific example of a suitable resetting means may be shown by reference to the partial diagram of the system shown in FIG. 7. The cores 31 at each section 20 to 29 of pulse generation means 2 may be suitably biased so that the application of the interrogating signal from pulse generation means 6 causes each core to switch to its other saturation condition and, under the influence of the bias source, return to its initial condition. This may be provided by means of a bias voltage source, for example, or magnetically by means of permanent magnets associated with each core in a well-known manner.

In FIG. 6 there is shown a portion only of a coded and an interrogating station to illustrate this other suitable means for resetting the cores of pulse generating means 1. To this end, pulse generation means 6 at the interrogating station produces, in addition to an interrogating signal, a resetting signal having the same characteristics and time duration, for example, as the previously generated interrogating signal. This reset signal is applied to either a separate transmitter or, by means of suitable switching means, to transmitter 7 for transmission thereby at a reset frequency $f_3$.

Additional receiver means 65 at the coded station is similar to receiver means 3, however, crystal diode 10 is poled in the opposite direction to provide an output at the terminals 16 and 17 which is of opposite polarity to that produced by receiver means 3. This opposite polarity signal suitably applied to terminals 18 and 19 of pulse train generation means 1, as for example, through appropriate resistance, causes each of the cores 31 to be reset to its initial remanence condition and the system is in condition to be interrogated again in response to the interrogating signal from another interrogating station. In yet another alternative, if a current transformer is employed to increase the current so that all of the cores 31 may be stacked on a single conductor the cessation of the interrogating signal may be automatically utilized to reset all of the cores without the use of capacitance 64.

Another inexpensive passive means suitable for use in the practice of this invention for producing a group of time spaced pulses in response to an interrogating signal may be a magnetic delay element such as is shown at 70 in FIG. 7. Such a magnetic delay element is shown and fully described and claimed in United States Patent No. 2,923,834, entitled "Magnetic Delay Element," and further shown and described in U.S. Patent 2,889,542, issued June 2, 1959, on a "Magnetic Coincidence Gating Register"; both of which are assigned to the assignee of the present invention.

In FIG. 7 there is shown a portion of a 10 pulse magnetic delay element 70. Magnetic delay element 70 is preferably composed of a magnetic material having a substantially rectangular hysteresis characteristic. Core 70 has an input leg 71 and 10 output legs 72–81, only legs 72, 73, 80 and 81 being particularly illustrated. Although the drawing is not to scale, it will be understood from the above incorporated application and patent that in practice the input leg 71 should have a minimum cross-sectional area at least equal to the sum of the combined minimum cross-sectional areas of all of the output legs in order to provide a return path for saturating flux flow through all of the output legs. The core 70 may also be tapered as shown since the minimum cross-sectional areas of the upper and lower portions of the core, respectively, which are necessary to provide sufficient flux paths to saturate all of the output legs, must be greater to the left of leg 72 than to the left of leg 73, etc.

It will further be understood that, although any desired number of output legs may in general be used, the delay element 70 shown in FIG. 7, for use in the system of this invention, should have as many output legs as the number of pulses which are required to be produced for the particular system in which it is employed.

An input winding 82 is wound on the input leg 71 and output windings 83, 84, 91 and 92 are wound on the legs, 72, 73, 80 and 81, respectively. One end of each of the output windings is shown connected to a common ground 93 whereas the other end of each winding is brought out to the separate respective terminals 94, 95, 102 and 103.

In operation, when an interrogating pulse, such as is shown in FIG. 2(*e*) is applied to terminal 104 of input winding 82, pulses will appear at the terminals 94–103 respectively. If the respective output windings associated with legs 72–81 of delay element 70 are suitably connected in series, a group of pulses, such as that shown in FIG. 2(*a*) will be produced. Alternatively, if the output legs are connected as shown particularly in FIG. 7, output pulses such as those shown at FIG. 2(*d*), one for each output leg, will be produced from the respective output legs 72–81. Since this magnetic delay element, therefore, produces a group of time spaced pulses in response to an appropriate interrogating signal, it is also particularly suitable for use in the practice of this invention for pulse train generation means 1 or 2 or both.

My novel communication system, therefore, transforms data previously assigned to a great many individual units, each of which has a coded station associated therewith, and transmits this assigned data, in the form of a group of pulses of predetermined number and arrangement, to a receiving and coincidence-gating apparatus at a particular interrogating station in response to an interrogating signal therefrom. Interrogating signals are received by each of a predetermined number of coded stations in turn causing the data assigned thereto to be transformed in the form of a particular coded group of time spaced pulses, representative of the data assigned to that station, and transmitted to the interrogating station. This coded data is received by suitable receiver apparatus at the interrogating station and coincidence-gated with time synchronized pulses generated thereat in response to this same interrogating signal. The output of the coincidence gates may be stored, or decoded, or applied to printing out, data processing or other appropriate utilization means. The apparatus at each of the many coded stations is activated and energized by the power from the interrogating signal itself so that no power supply, batteries or other energy sources are required.

While the particular embodiment of the communication system described in detail in the specification is particularly adapted to achieve the main objects stated, the system has a wide range of applications. Each particular application to some extent determines the advisability of utilizing apparatus which provides the desired functions, using more complex known units, even though cost and circuit complexity may be increased thereby. The form disclosed is extremely simple, inexpensive and reliable and is, therefore, particularly suited for providing a system in which extremely inexpensive apparatus must be employed due to the large number of units to be identified. In such an application the apparatus required at each of the units to be identified to transform and transmit the assigned data must be very inexpensive or else the cost of the system would be prohibitive.

The cost of the apparatus required at the coded station, for example, is an extremely important consideration in a railroad car identification system where, in the United States alone, there are about 2,000,000 freight cars to be identified each of which would have associated therewith one of the coded stations of this invention. Further, there are probably 2,000 different locations where it would be highly desirable to interrogate and identify the freight cars as they move past. It is evident, therefore, that the system of this invention is particularly suited for even such extreme applications in that the cost of the entire apparatus at the coding stations of this invention is extremely low and may be conveniently provided without the use of batteries or other energy sources which would contribute to the maintenance problem. Further, the apparatus required at the interrogating stations may also be provided at low cost so that the entire system of this invention is more reliable, less expensive and less complex than anything known heretofore.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent by the United States is:

1. In combination, an unpowered coded station; an interrogating station; means associated with said interrogating station for transmitting an interrogating signal carrying sufficient power to completely operate said unpowered coded station, said unpowered coded station including, (a) receiver means for receiving said interrogating signal, (b) pulse train generation means for developing a predetermined number of pulses spaced in time in response to the application of said received interrogating signal, (c) pulse selection means for arranging said pulses to form a coded group of time spaced pulses representative of said coded station, (d) and transmitter means for transmitting said coded pulse group, said coded station being energized and rendered operative upon receipt of and only from the power in said interrogating signal;

receiver means associated with said interrogating station for receiving said coded group of time spaced pulses; means for producing a time-synchronized reference group of time spaced pulses; and means also associated with said interrogating station for coincidence-gating said received coded pulse group with said time synchronized reference group of time spaced pulses.

2. The combination of claim 1 wherein said time-synchronized reference group of time spaced pulses is produced at said interrogating station.

3. In combination, an interrogating station; an unpowered coded station; means associated with said interrogating station for transmitting an interrogating signal carrying sufficient power to completely operate said coded station; means associated with said unpowered coded station including, (a) a crystal detector for receiving said interrogating signal, (b) a passive nonlinear delay line adapted to produce a predetermined number of substantially similar pulses spaced in time upon the application thereto of said received interrogating signal, (c) means for arranging the pulses so produced to form a coded group of time spaced pulses representative of said coded station, (d) and transmitter means for transmitting said coded pulse group, said means at said coded station being energized and rendered operative to develop and transmit a coded group of time spaced pulses upon receipt of and only from the power supplied by said interrogating station;

receiving means associated with said interrogating station for receiving said coded group of time spaced pulses; means for producing a time-synchronized reference group of time spaced pulses; and means also associated with said interrogating station for coincidence-gating said received pulse group with a reference pulse group corresponding in number and substantially synchronized in time with the pulse group developed by the nonlinear delay line at said coded station.

4. The combination of claim 3 wherein said reference pulse group is produced at said interrogating station.

5. The combination of claim 3 wherein said transmitter means associated with said unpowered coded station comprises:

(a) a tunnel diode device exhibiting a negative resistance region in the low forward voltage range of its current-voltage characteristic, (b) means in circuit with said tunnel diode device adapted to bias said device at a point in its negative resistance region when a pulse of said coded pulse group is applied thereto, (c) and an oscillatory circuit coupled to said tunnel diode device providing an impedance which exceeds the absolute value of the tunnel diode negative resistance so that oscillations are produced from the power of said pulse for a time corresponding to the duration thereof.

6. In a system for describing each of a plurality of different objects having relative motion with respect to a given interrogation point, the combination comprising: an unpowered coded station associated with each of the objects to be described; an interrogating station; means associated with said interrogating station for transmitting an interrogating signal adapted to completely power and operate only the coded station associated with the object at said interrogation point; means associated with said coded station including, (a) a crystal detector for receiving said interrogating signal, (b) passive pulse train generation means adapted to develop a group of substantially similar pulses spaced in time upon the application thereto of said received interrogating signal, (c) means for arranging the pulses so produced to form a coded group representative of the description of the object, (d) and transmitter means completely powered by and transmitting said coded group of time spaced pulses;

and further means associated with said interrogating station including, (a) receiver means for receiving said coded group of time spaced pulses, (a′) means for producing a time-synchronized reference group of time spaced pulses, (b) and means for coincidence-gating the received pulses with a reference group of time spaced pulses substantially synchronized in time and corresponding in number with the group of pulses developed at said coded station.

7. The system of claim 6 wherein the reference group of time spaced pulses is developed at said interrogating station by a passive pulse train generation means corresponding to that at said coded station and being energized substantially simultaneously with the transmission of said interrogating signal so that the time spaced pulses of said reference group and the group developed at said coded station exactly correspond in number and substantially correspond in time.

References Cited by the Examiner

UNITED STATES PATENTS

| | | | |
|---|---|---|---|
| 2,719,284 | 9/1955 | Roberts et al. | 340—151 |
| 2,800,596 | 7/1957 | Bolie | 307—88 |
| 2,812,428 | 12/1957 | Rath | 325—8 |
| 2,832,951 | 4/1958 | Browne | 340—348 |
| 2,889,542 | 6/1959 | Goldner et al. | 340—174 |
| 2,910,579 | 10/1959 | Jones et al. | 250—6 |
| 2,914,757 | 11/1959 | Millership et al. | 340—173 |
| 2,948,886 | 8/1960 | McIlwain | 340—152 |
| 2,973,509 | 2/1961 | Majerus et al. | 340—167 |
| 3,022,492 | 2/1962 | Kleist et al. | |
| 3,049,706 | 8/1962 | Freedman | 343—6.5 |
| 3,054,100 | 9/1962 | Jones | 246—63 XR |
| 3,117,277 | 1/1964 | De Magondeaux | 325—8 XR |
| 3,145,291 | 8/1964 | Brainard | 246—2 XR |
| 3,145,380 | 9/1964 | Currie | 340—152 |
| 3,171,108 | 2/1965 | MacKeen | 343—6.5 XR |

NEIL C. READ, *Primary Examiner.*

P. XIARHOS, *Assistant Examiner.*